No. 772,693. PATENTED OCT. 18, 1904.
W. E. CLEVELAND.
PEDAL ACTION FOR PIANOS.
APPLICATION FILED FEB. 11, 1904.
NO MODEL.
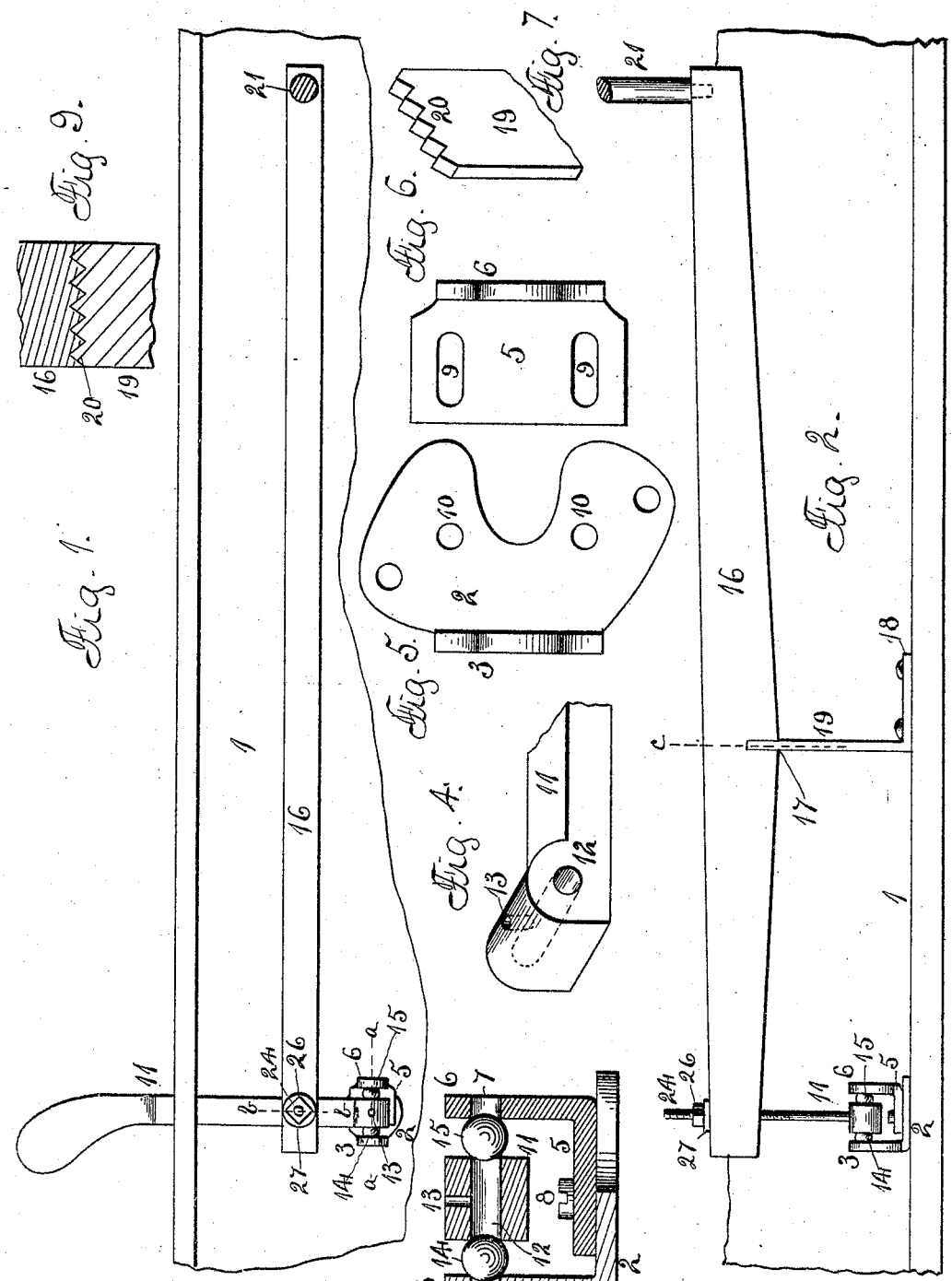
Witnesses:
Inventor:
Willard E. Cleveland
By A. O. Behel
atty.

No. 772,693. Patented October 18, 1904.

UNITED STATES PATENT OFFICE.

WILLARD E. CLEVELAND, OF OREGON, ILLINOIS.

PEDAL-ACTION FOR PIANOS.

SPECIFICATION forming part of Letters Patent No. 772,693, dated October 18, 1904.

Application filed February 11, 1904. Serial No. 193,056. (No model.)

*To all whom it may concern:*

Be it known that I, WILLARD E. CLEVELAND, a citizen of the United States, residing at Oregon, in the county of Ogle and State of Illinois, have invented certain new and useful Improvements in Pedal-Actions for Pianos, of which the following is a specification.

The object of this invention is to construct a pedal-action for pianos in which the pedal has a ball-bearing connection with its support.

The further object of this invention is to form a connection between the beam and its spring-support in such a manner that the beam is held from lateral displacement without the parts being secured together.

The further object of this invention is to form a connection between the beam and pedal by means of a rod passing through the pedal and through a felt or other sound-deadening bushing.

In the accompanying drawings, Figure 1 is a plan view of a pedal-action embodying my improvements. Fig. 2 is an elevation. Fig. 3 is a section on dotted line *a*, Fig. 1. Fig. 4 is an isometrical representation of the inner end of the pedal. Figs. 5 and 6 are plan views of the support for the pedal. Fig. 7 is an isometrical representation of the upper end of the spring-support for the beam. Fig. 8 is a section on dotted line *b*. Fig. 9 is a section on dotted line *c*, Fig. 2.

To the base-board 1 is secured the bracket shown at Fig. 5, comprising the base portion 2 and vertical section 3, having an opening 4.
The bracket shown at Fig. 6, comprising the base portion 5 and vertical section 6, having an opening 7, is located in connection with the base portion 2 and held in place by screws 8 passing through the slots 9 and openings 10 in the base portion 2 in order that the vertical portion 6 may be adjusted toward the vertical portion 3 and clamped when adjusted.

The pedal 11 has its inner end provided with a transverse opening 12 and a vertical opening 13, communicating with the transverse opening 12. The inner end of the pedal is located between the vertical sections 3 and 6 of the brackets, and a ball 14 is located between one face of the pedal and the vertical section 3, and a ball 15 is located between the other face of the pedal and the vertical section 6, and the vertical section 6 is adjusted to hold the parts in line, as shown in section at Fig. 3, thereby producing an antifriction connection between the pedal and its support and one in which the wear can be taken up. Oil can be presented to the balls through the vertical opening 13 and the transverse opening 12 through the inner end of the pedal.

A beam 16 has a transverse groove 17 cut in its under face. A bar-spring formed of the foot-section 18 and the vertical section 19 is secured to the base-board by screws passing through the foot-section. The vertical section has its upper end provided with teeth 20. The beam is placed in connection with the spring, so that the groove 17 receives the upper end of the spring and is driven down onto the teeth sufficiently to embed the teeth into the wood, thereby holding the beam from lateral displacement. The damper-rod 21 has an engagement with the beam in the usual manner.

The pedal 11 has a vertical opening 22, and within which is located a bushing 23 of felt, leather, or other sound-deadening medium. A rod 24 is passed through the bushing, having its head 25 resting against the lower face of the bushing and its upper end passing through the beam 16, receiving a nut 26 thereon, which rests against the felt washer 27.

I claim as my invention—

1. In a pedal-action for pianos, the combination of a pedal, a two-part bracket-support for the pedal, a ball located between one face of the pedal and one part of the bracket-support, and a ball located between the other face of the pedal and the other part of the bracket-support, the parts of the bracket-support made adjustable to take up the wear.

2. In a pedal-action for pianos, the combination of a pedal having its inner end provided with a transverse opening, a support having two openings coinciding with the opening in the pedal, and two balls forming a connection between the support and pedal and seated in the openings.

3. In a pedal-action for pianos, the combination of a pedal, a support for the pedal and balls forming a connection between the pedal and support, the pedal provided with an oil-duct leading to the balls.

WILLARD E. CLEVELAND.

Witnesses:
 OLIVE POTTER,
 ETHEL PEARSON.